Aug. 21, 1928. 1,681,306
J. W. MOON
MACHINE FOR CUTTING TO LENGTH CONTINUOUSLY FORMING TUBING
Filed March 23, 1925 3 Sheets-Sheet 2
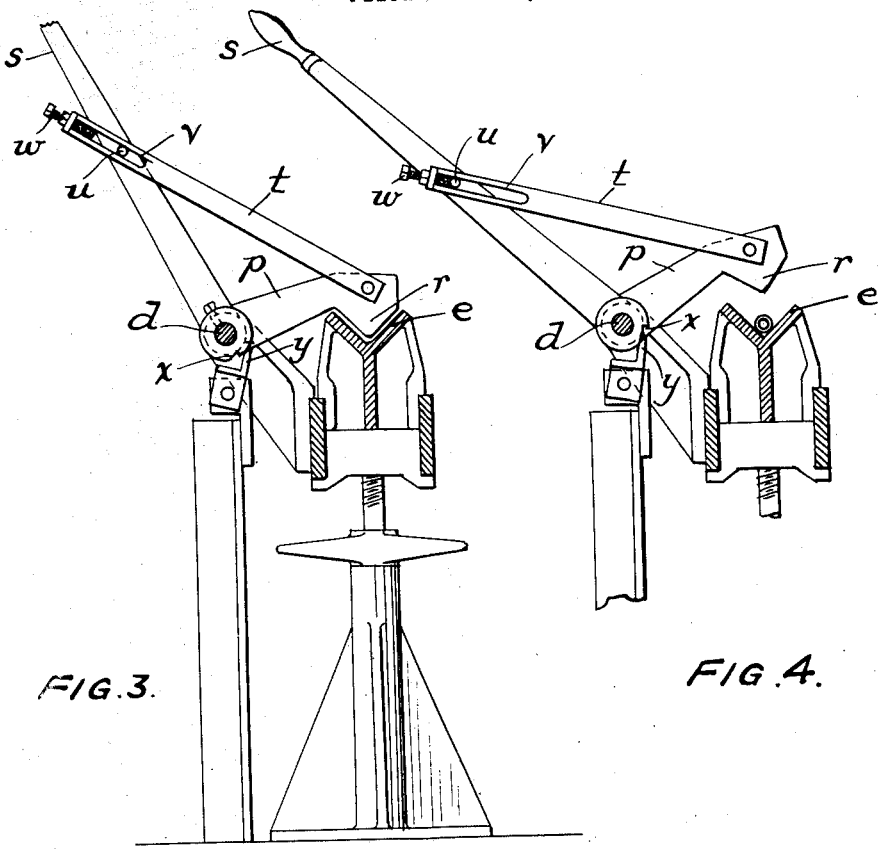
FIG. 3.  FIG. 4.
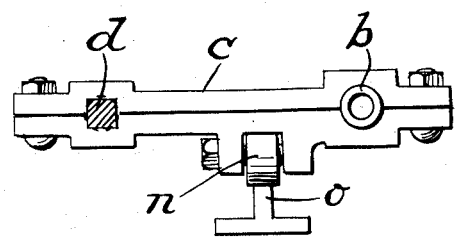 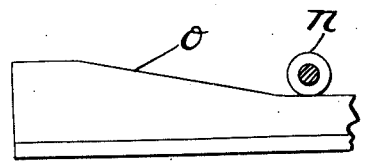
FIG. 5. FIG. 6.
WITNESS:
INVENTOR
John W. Moon
BY
Brosser and Harding
ATTORNEYS.

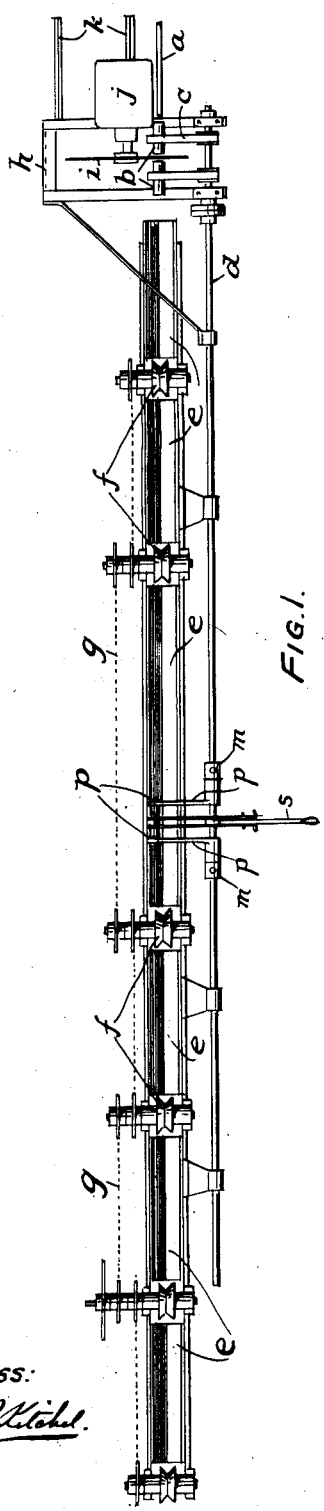
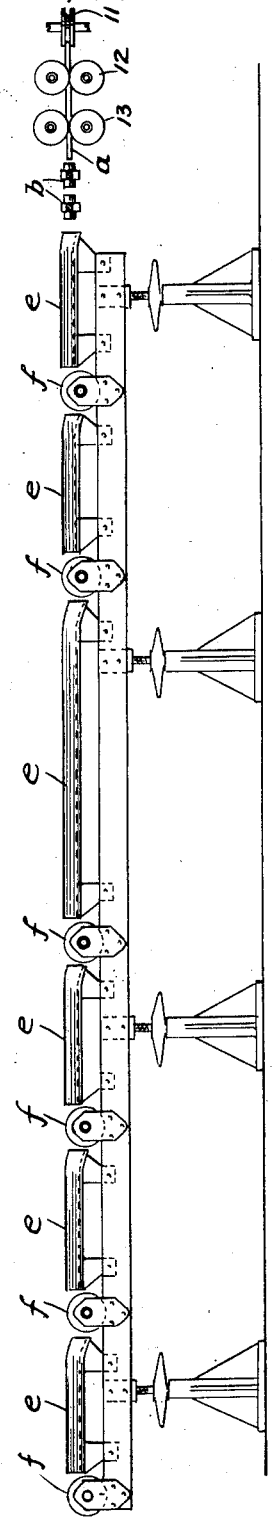

Aug. 21, 1928.  
J. W. MOON  
1,681,306  
MACHINE FOR CUTTING TO LENGTH CONTINUOUSLY FORMING TUBING  
Filed March 23, 1925  3 Sheets-Sheet 3

WITNESS:

INVENTOR  
John W. Moon  
BY  
ATTORNEYS.

Patented Aug. 21, 1928.

1,681,306

UNITED STATES PATENT OFFICE.

JOHN W. MOON, OF BUTLER, PENNSYLVANIA, ASSIGNOR TO FRETZ-MOON TUBE COMPANY, OF BUTLER, PENNSYLVANIA, A CORPORATION OF PENNSYLVANIA.

MACHINE FOR CUTTING TO LENGTH CONTINUOUSLY-FORMING TUBING.

Application filed March 23, 1925. Serial No. 17,673.

In the manufacture of metal tubing or pipe set forth in the patents issued to me December 4, 1923, Nos. 1,476,632 and 1,476,537, skelp of indefinite length is fed continuously through a long enveloping heating medium and is gradually heated and its edges raised to a welding heat and simultaneously therewith is bent into tubular form and its edges welded together to form a tube or pipe. Thereby tubing or pipe of indefinite length is produced continuously. This tubing must be cut into marketable lengths as it continues to be fed from the mill.

The object of the present invention is to provide suitable mechanism, which may be partly or wholly automatic, whereby the tubing may be cut into predetermined lengths without dependence on measurement by an operator, and without interruption of the continuous delivery of the tubing.

A preferred embodiment of the invention is shown in the accompanying drawings, in which—

Fig. 1 is a plan view of a partly automatic machine embodying my invention.

Fig. 2 is a side elevation, showing also (at the right hand end) a diagram of the tube-forming mechanism which delivers the continuous tubing to the machine.

Fig. 3 is a detail elevation of the hand-actuated mechanism for turning the main operating shaft and withdrawing the stop for arresting forward movement of the continuously formed tubing.

Fig. 4 is a view, similar to Fig. 3, with the hand-controlled mechanism in a different position.

Fig. 5 is a side view of the means for lifting the tubing against the saw.

Fig. 6 is a detail end view of part of the means shown in Fig. 5.

Figure 7:
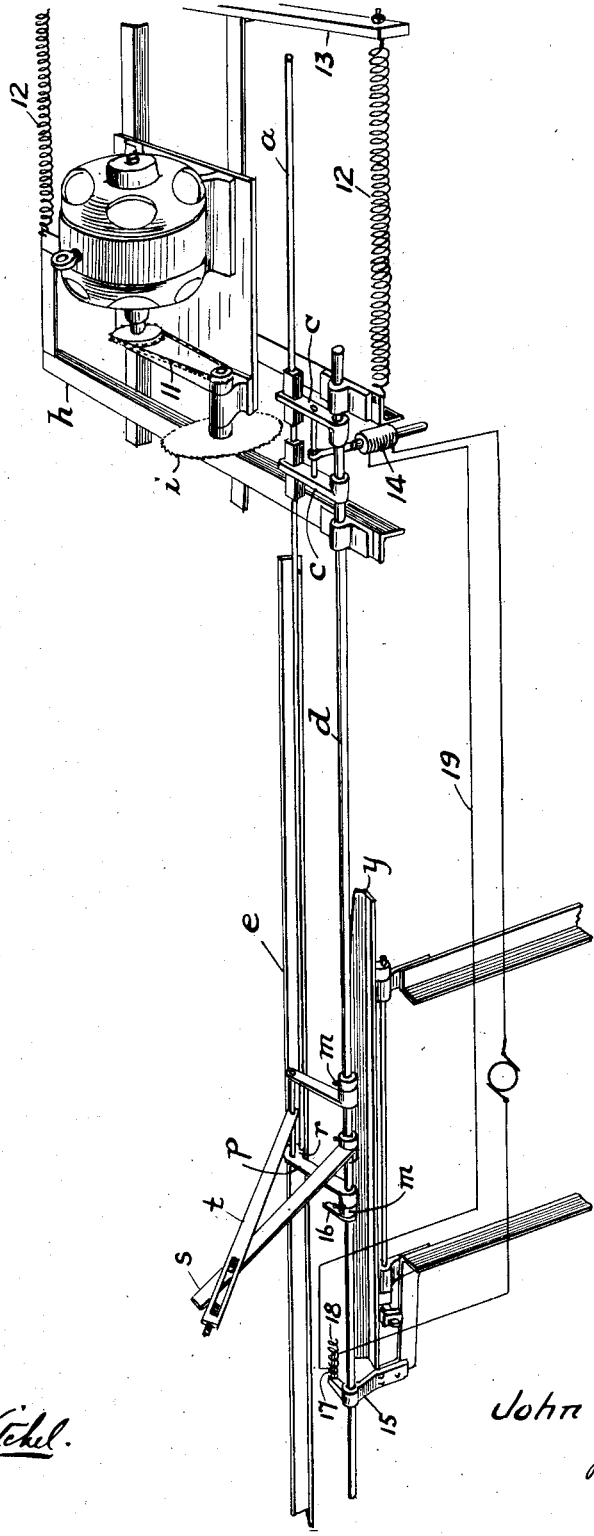
Fig. 7 is a perspective view of a wholly automatic machine.

The completed tubing $a$, as it emerges from the forming, sizing and finishing rolls of the mill, travels through two nipple guides $b$ on the ends of arms $c$ secured to a longitudinally movable rock-shaft $d$ extending in the direction of travel of the tubing. Alongside the shaft are troughs $e$ alternating with tube-conveying rollers $f$. The shafts of more nearly adjacent rollers carry sprocket wheels which are connected together by sprocket chains $g$. One of the roller shafts is positively driven, thereby imparting rotation to the remaining roller shafts. The rollers are driven at a higher rate of speed than that at which the tubing is delivered from the mill.

At the rear end of shaft $d$ is a saw carriage $h$, which is movable with shaft $d$ in the latter's longitudinal movement, but does not rock with the shaft. Carriage $h$ carries a saw $i$, which is driven by any suitable means, as by a motor $j$, the carriage being slidable on ways $k$. The saw should be driven at a high peripheral speed of, say, 18,000 feet per minute. The periphery of the saw is a slight, but safe, distance from the tubing except when the latter is lifted into contact with its edge, as hereinafter described.

Pivoted on shaft $d$, but held from moving longitudinally thereon by adjustable collars $m$, are arms $p$ (see Figs. 3 and 4) one or both of whose outer ends are V-shaped to conform to the shape of one of the troughs. The V-shaped end of the rear arm $p$ constitutes a stop or abutment $r$, which is engaged by the front end of the advancing tubing. The advancing tubing, before it is severed by the saw, is pushed forward positively by the forming, sizing and finishing rolls of the mill, and its forward end strikes the abutment $r$ with sufficient force to propel the same forward and carry with it rock-shaft $d$, rock-arms $c$, and saw-carriage $h$.

One of the rock arms $c$ carries on its lower side a roller $n$, which rests on a fixed cam $o$ (see Figs. 5 and 6). As the arms $c$ are carried along with shaft $d$, roller $n$ rides up the inclined track of cam $o$, and swings arms $c$ so as to bring the tubing into operative relation with saw $i$, which quickly severs the tubing.

Secured to shaft $d$ is a hand lever $s$ (see Figs. 3 and 4). If desired, roller $n$ and cam $o$ may be omitted, or they may be relied on merely to swing the arms $c$ a distance sufficient to bring the tubing close to the saw edge; the tubing being lifted against the saw by the further rocking movement of shaft $d$ imparted to it by the manual operation of operating lever $s$.

In either mode of operation, it is necessary, immediately after the tubing has been cut, to lift the stop $r$ so as to allow the severed tube section to advance and also so as to arrest the longitudinal movement of stop $r$, shaft $d$, arms $c$ and saw-carriage $h$. To effect this, the following means are provided. A link $t$ is pivoted on stop $r$. This link has a slot $v$ which engages a pin $u$ on lever $s$. Secured to the end of link $t$, in line with pin $u$, is a cap screw $w$. As the operator, after the tubing is severed, continues to swing lever $s$ toward the position shown in Fig. 4, pin $u$ contacts with cap-screw $w$ and, in the final movement of lever $s$, stop $r$ is withdrawn from in front of the severed tube section, which is then advanced by the conveying rollers $f$ in front of stop $r$ and is carried away to the cooling rack (not shown). The withdrawal of stop $r$ arrests the longitudinal movement of stop $r$, shaft $d$, arms $c$ and saw-carriage $h$.

The operator then swings lever $s$ back to its original position. During this movement, it is desirable to maintain the stop $r$ clear of the severed tube section traveling beneath it. To effect this, the hub of lever $p$ is provided with a notch $x$, which engages an angle pawl $y$, the arms $p$ being thereby held upraised in the return movement of lever $s$.

After the rear end of the severed tube section has passed beyond stop $r$, the operator, by means of a side thrust on lever $s$ in the direction of extension of shaft $d$, returns this shaft, the stop $r$, arms $c$ and saw-carriage $h$ to their original position. The pawl $y$ is bevelled so that, in this movement, the notch $x$ rides over the pawl and allows stop $r$ to drop.

In the meantime, the forward end of the continuous tubing at the rear of the severed tube section is advancing, at a slower speed than that at which the severed tube section is being carried away; and soon after the parts have been restored to their original positions, this forward end of the tubing contacts with stop $r$, and the entire operation hereinbefore described is repeated.

At the right end of Fig. 2, I have indicated bending and welding rolls 11, and sizing and finishing rolls 12 and 13 (all of which rolls are preferably positively driven), from which the continuous tubing is delivered directly from a furnace to the described tube-severing apparatus.

In Fig. 7 I have shown a wholly automatic tube-severing machine. Like parts are similarly lettered. The roller $n$ and cam $o$ are omitted. The saw $i$ is mounted on a counter shaft, which is driven, by a chain drive 11, from the motor shaft. The carriage $h$ is connected with a fixed support 13 by means of springs 12, which tend to draw the carriage $h$ in a direction opposite to the direction of travel of the tubing. The arms $c$ carrying the tube guides $b$ are lifted by means of a solenoid 14.

In advance of the arm $p$ is a frame 15, through which the shaft $d$ is slidable. Secured to one of the fixed collars $m$ is a circuit closing switch arm 16. The frame 15 carries a backwardly extending pin 17 and (insulated therefrom) a coiled spring 18 which normally extends backward beyond the pin 17. The solenoid is in an electric circuit 19, the terminals of which are the pin 17 and the spring 18.

As the rock shaft $d$ is moved forward by the engagement of the front end of the advancing tubing with the stop $r$ carried by one of the arms $p$, arm 16 contacts with spring 18, compressing it until the arm also contacts with pin 17, thus closing the circuit. Solenoid 14 is immediately energized and lifts arms $c$ into operative relation with saw $i$. Shaft $d$ is at the same time rocked so as to swing lever $s$ far enough to actuate link $t$ to withdraw stop $r$ from in front of the tubing, so as to allow the severed section of tubing to be carried away. This releases the whole mechanism from the influence of the tubing, and springs 12 immediately return the mechanism to its original position.

It will be understood that the movement of the tubing against the saw need only be a relative movement, my invention not being limited to a stationary saw and absolutely movable tubing except where specifically so claimed.

What I claim is:

1. In a machine for cutting continuous tubing to length, the combination with means to feed forward finished tubing, of conveyors adapted to carry forward the cut-off sections, a shaft extending parallel with the tubing from a point near the hereinafter specified stop to a point near the hereinafter specified cutting mechanism, said shaft being movable longitudinally and rockable on its axis, a stop swingable on said shaft, the stop and shaft being movable together in the longitudinal movement of the shaft, cutting mechanism comprising a saw and a tube guide, one of the last two elements being movable, in the rocking movement of the shaft, to bring one element into operative relation with the other element and both of said elements being movable with the shaft in its longitudinal movement, means adapted to be operated to rock the shaft on its axis after the engagement of the stop by the forward movement of the traveling tubing, and means operable in the rocking movement of the shaft to withdraw the stop to allow the severed section to be carried forward by the conveyors; the shaft, stop, tube guide and saw being then returnable to their initial position to allow said operations to be repeated.

2. In a machine for cutting continuous tubing to length, the combination with means to carry forward finished tubing, of conveyors adapted to carry forward the cut-off sections, a stop adapted to be engaged and moved forward by the forward end of traveling tubing, a shaft carrying the stop and movable longitudinally with the stop and also rockable on its axis, a saw carried by the shaft and movable with the shaft in the latter's longitudinal movement, a lever secured to and adapted to be operated to rock the shaft after said stop has been so engaged by the traveling tubing, a tube guide operable by the shaft in its rocking movement to move the tubing into operative relation with the saw, means operable by said lever to withdraw said stop from in front of the cut-off section, said lever being returnable to retract said tube guide from the saw, and said lever, shaft, saw, tube guide and stop being returnable to their original positions to allow the specified operations to be repeated.

3. In a machine for cutting continuous tubing to length, the combination with means to carry forward finished tubing, of conveyors adapted to carry forward the cut-off sections, a stop adapted to be engaged and moved forward by the forward end of traveling tubing, a shaft carrying the stop and movable longitudinally with the stop and also rockable on its axis, a saw carried by the shaft and movable with the shaft in the latter's longitudinal movement, a lever secured to and adapted to be operated to rock the shaft after said stop has been so engaged by the traveling tubing, a tube guide operable by the shaft in its rocking movement to move the tubing into operative relation with the saw, means operable by said lever to withdraw said stop from in front of the cut-off section, said lever being returnable to retract said tube guide from the saw, means to retain said stop in its withdrawn position in the return movement of said lever, said shaft being also movable in the direction of its extension to shift the shaft back to its original position and thereby return the tube guide, saw and stop to their original longitudinal positions, the bodily return movement of the stop releasing it from its withdrawn position and again positioning it in the path of travel of the forward end of the traveling tubing.

4. In a machine for cutting continuous tubing to length, the combination with means to feed forward the continuously formed tubing, of a conveyor adapted to carry off severed sections at a higher speed than that at which the forward end of the tubing back of the severed sections travels, a movable stop with which the forward end of the tubing contacts, a saw, mechanism connecting the stop and saw by which the stop and saw are movable in unison in a direction parallel to the direction of feed of the tubing and which is so movable by the traveling tubing when the latter engages the stop, said mechanism including a rock shaft, an electric circuit adapted to be closed by said mechanism, an electro-magnetic device operable by said circuit and adapted to bring the tubing and saw into operative relationship and to rock said shaft, said mechanism also including means operable in the rocking of the shaft to withdraw said stop, and means to longitudinally retract said mechanism and saw and stop.

5. In a machine for cutting continuous tubing to length, the combination with means to feed forward finished tubing, of a shaft extending in the direction of the tubing and movable in the direction of its axis and rockable on its axis; a stop, a tube guide and a saw, all movable with the shaft in the direction of its axis; said stop being adapted to be engaged by the advancing tubing and, together with the tube guide and saw, to be moved forward with the tubing, means operable by the shaft in its rocking movement to bring the saw and tubing into operative relationship and thereby effect a severance of a tube section, a lever adapted to be operable after the engagement of the tubing with said stop and connected with said shaft and also with said stop and adapted, in the first part of its swinging movement in one direction, to rock said shaft as aforesaid and in a subsequent part of its movement in the same direction to withdraw said stop and release the cut-off section, and conveying means adapted to carry forward the cut-off section.

6. In a machine for cutting continuous tubing to length, the combination with means to feed forward finished tubing, of a shaft extending in the direction of the tubing and movable in the direction of its axis and rockable on its axis; a stop, a tube guide and a saw, all movable with the shaft in the direction of its axis; said stop being adapted to be engaged by the advancing tubing and, together with the tube guide and saw, to be moved forward with the tubing, means operable by the shaft in its rocking movement to bring the saw and tubing into operative relationship and thereby effect a severance of a tube section, a lever adapted to be operable after the engagement of the tubing with said stop and connected with said shaft and also with said stop and adapted, in the first part of its swinging movement in one direction, to rock said shaft as aforesaid and in a subsequent part of its movement in the same direction to withdraw said stop and release the cut-off section, and conveying means adapted to carry forward the cut-off section, means to restrain the stop, in the return movement of the lever, from dropping onto the traveling severed tube section, said restraining means being rendered inactive in the movement of the shaft, tube guide and saw to its original position.

7. In a machine for cutting continuous tubing to length, the combination with means to feed forward finished tubing, of a shaft extending in the direction of the tubing and movable in the direction of its axis and rockable on its axis; a stop, a tube guide and a saw, all movable with the shaft in the direction of its axis; said stop being adapted to be engaged by the advancing tubing and, together with the tube guide and saw, to be moved forward with the tubing, means operable by the shaft in its rocking movement to bring the saw and tubing into operative relationship and thereby effect a severance of a tube section, a lever secured to and adapted to so rock said shaft, said stop being loosely pivoted on said shaft, and a link connecting said lever and stop and so slidably connected with one of them that in the movement of said lever to rock said shaft the stop will be moved from in front of the tubing after the tube severing operation, and conveying means to carry forward the cut-off section.

8. In a machine for cutting continuous tubing to length, the combination with means to feed forward finished tubing, of a shaft extending in the direction of the tubing and movable in the direction of its axis and rockable on its axis; a stop, a tube guide and a saw, all movable with the shaft in the direction of its axis; said stop being adapted to be engaged by the advancing tubing and, together with the tube guide and saw, to be moved forward with the tubing, means operable by the shaft in its rocking movement to bring the saw and tubing into operative relationship and thereby effect a severance of a tube section, a lever adapted to be operable after the engagement of the tubing with said stop and connected with said shaft and also with said stop and adapted, in the first part of its swinging movement in one direction, to rock said shaft as aforesaid and in a subsequent part of its movement in the same direction to withdraw said stop and release the cut-off section, and conveying means adapted to carry forward the cut-off section, a fixedly positioned device adapted to hold said stop, in the return movement of the lever, from dropping onto the traveling severed tubing and adapted to release said stop and allow it to drop into operative position in the movement of the shaft, tube guide and saw to its original position.

In testimony of which invention, I have hereunto set my hand, at Philadelphia, Pennsylvania, on this 23d day of February, 1925.

JOHN W. MOON.